US009317956B2

(12) United States Patent
Lee et al.

(10) Patent No.: US 9,317,956 B2
(45) Date of Patent: Apr. 19, 2016

(54) APPARATUS AND METHOD FOR PROVIDING MIXED REALITY CONTENTS FOR LEARNING THROUGH STORY-BASED VIRTUAL EXPERIENCE

(71) Applicant: Electronics and Telecommunications Research Institute, Daejeon (KR)

(72) Inventors: Su Woong Lee, Daejeon (KR); Jun Sup Lee, Daejeon (KR); Jae Sang Yoo, Daejeon (KR); Hyung Keun Jee, Daejeon (KR); Jun Suk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 479 days.

(21) Appl. No.: 13/677,244

(22) Filed: Nov. 14, 2012

(65) Prior Publication Data

US 2013/0120372 A1    May 16, 2013

(30) Foreign Application Priority Data

Nov. 14, 2011    (KR) .................. 10-2011-0117969

(51) Int. Cl.
*G06T 15/00*    (2011.01)
*G06T 19/00*    (2011.01)

(52) U.S. Cl.
CPC .............. *G06T 15/00* (2013.01); *G06T 19/006* (2013.01)

(58) Field of Classification Search
CPC ........................... G06T 15/00; G06T 19/006
See application file for complete search history.

(56) References Cited

U.S. PATENT DOCUMENTS

| 2005/0024388 | A1* | 2/2005 | Takemoto ...................... 345/633 |
| 2010/0103196 | A1* | 4/2010 | Kumar et al. ................. 345/633 |
| 2011/0102549 | A1  | 5/2011 | Takahashi |

FOREIGN PATENT DOCUMENTS

| JP | 10255052 A     | 9/1998  |
| JP | 2007-147642 A  | 6/2007  |
| JP | 2009-145883 A  | 7/2009  |
| KR | 10-2000-0075601 A | 12/2000 |
| KR | 1020010065751 A | 7/2001  |
| KR | 10-2009-0083504 | 8/2009  |
| KR | 1020100073076 A | 7/2010  |
| KR | 1020110099998 A | 9/2011  |

* cited by examiner

*Primary Examiner* — Maurice L McDowell, Jr.

(57) ABSTRACT

Disclosed are an apparatus and a method for providing mixed reality for a virtual experience service, and more particularly, an apparatus and a method for providing mixed reality contents for learning a virtual experience based on a story that provides a service in which a user in a real world appears in a virtual world having the story to undergo a virtual experience. The method picks up the user image in the real world and synthesizes the picked-up image with a desired position of a 3D virtual world. According to the present disclosure, a realistic experience based learning can be provided while a spatial limit is overcome.

6 Claims, 6 Drawing Sheets

APPARATUS AND METHOD FOR PROVIDING MIXED REALITY CONTENTS FOR LEARNING THROUGH STORY-BASED VIRTUAL EXPERIENCE

CROSS-REFERENCE TO RELATED APPLICATIONS

This application is based on and claims priority from Korean Patent Application No. 10-2011-0117969, filed on Nov. 14, 2011, with the Korean Intellectual Property Office, the disclosure of which is incorporated herein in its entirety by reference.

TECHNICAL FIELD

The present disclosure relates to an apparatus and a method for providing mixed reality contents for a virtual experience service, and more particularly, to an apparatus and a method for providing mixed reality contents for learning through a story-based virtual experience that constructs a 3D virtual world by virtually modeling an actual environment having the story according to an experience target and provides contents of mixed reality by synthesizing as if a user enters into a desired virtual world.

BACKGROUND

In recent years, e-learning technique such as a remote video education or a virtual classroom that is learned in an Internet based virtual learning space has been provided.

However, the remote video education simply displays an image of a teacher and an image of a student at a predetermined position on a screen by connecting images between the teacher and the student, and the virtual learning space provides learning to be performed through an avatar instead of a person, and as a result, there is a limit in giving a realistic feeling or an immersive feeling.

Therefore, in recent years, English villages have been established to provide off-line spaces where participants can obtain learning experiences of English. However, this method also has a spatial limit and thus not many people can have opportunities with this method.

SUMMARY

Accordingly, the present disclosure has been made in an effort to provide an apparatus and a method for providing mixed reality contents for learning through a story-based virtual experience. The present disclosure, deviating from simply changing a background, integrates a virtual world with a real world by virtually modeling a real environment having the story. Also, the present disclosure takes an image of a user in real word and synthesizes the taken image to a desired position of a 3D virtual world allowing the user in a real world to actually enter into a virtual world and experience the virtual world.

According to a first aspect of the present disclosure, there is provided an apparatus for providing mixed reality contents for learning through a story-based virtual experience, including an image camera configured to pick up a user image under an actual environment; a virtual environment setting unit configured to set an action zone in which the user is synthesized with an image of a virtual world having the story and set a corner coordinate of the action zone as a reference point; a user position tracking unit configured to track a user position from the user image picked up by the image camera to calculate the tracked position as four rectangular corner coordinates; a 3D coordinate converting unit configured to convert the position of the user calculated through the user position tracking unit into a 3D coordinate; and a synthesis unit configured to provide mixed reality contents in which the image of the virtual world and the user image are synthesized by matching the user position converted through the 3D coordinate converting unit based on the corner coordinate of the action zone.

According to a second aspect of the present disclosure, there is provided a method for providing mixed reality contents for learning through a story-based virtual experience, including acquiring a user image by picking up the user image under an actual environment; setting an action zone in which a 3D image of a virtual world having the story is synthesized with the acquired user image and setting a corner coordinate of the action zone as a reference point; tracking a user position from the acquired user image to calculate the tracked user position as four rectangular corner coordinates; converting the calculated position of the user into a 3D coordinate; and matching the user position converted into the 3D coordinate with reference to the corner coordinate of the action zone, thereby providing mixed reality contents in which the 3D image of the virtual world and the acquired user image are synthesized.

According to exemplary embodiments of the present disclosure, an experience-based education service that overcomes a spatial limit and is realistic can be provided that enables a virtual experience as if a user in a real world enters into a virtual space and experiences the virtual world in a real space.

When an environment of the virtual space changes by tracking according to the user's movement in the virtual space or the virtual space is changed by changing the story, the sense of reality and the sense of immersion are further improved by smoothly changing a screen. Further, a level at which an image of the user is inclined by a camera and a level at which a bottom of a virtual world is inclined accurately coincide with each other through an image synthesis technique of the present disclosure, the sense of reality is significantly increased.

Since the user or a content producer can appropriately use either the third person point of view or the first person point of view in configuring the screen according to the flow of the story, a variety of experiences can be provided to the user.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
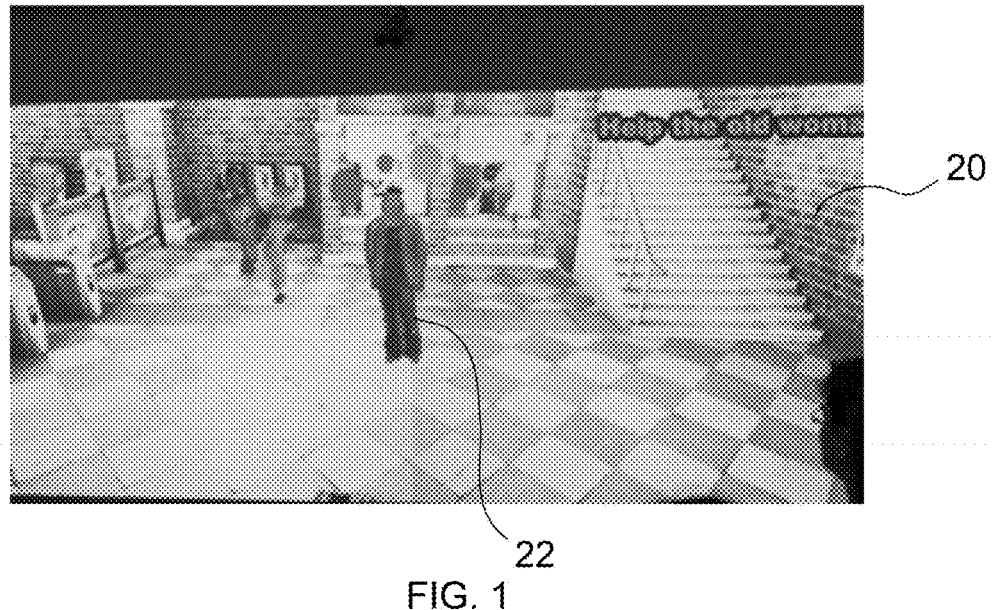
FIG. 1 is an exemplary screen on which contents created by synthesizing a user in real world with a virtual world having a story are displayed.

In the following detailed description, reference is made to the accompanying drawing, which form a part hereof. The illustrative exemplary embodiments described in the detailed description, drawing, and claims are not meant to be limiting. Other exemplary embodiments may be utilized, and other changes may be made, without departing from the spirit or scope of the subject matter presented here.

Hereinafter, exemplary embodiments of the present disclosure will be described in detail with reference to the accompanying drawings. The configurations of the present disclosure and the resulting operational effects will be apparently appreciated through the detailed description described as below. Prior to the detailed description of the present disclosure, it should be noted that the same components refer to the same reference numerals anywhere as possible in the drawings and well-known functions or constructions will not be described in detail when it is judged that they may unnecessarily obscure the understanding of the present disclosure. Unless explicitly described to the contrary, the word "comprise" and variations such as "comprises" or "comprising" will be understood to imply the inclusion of stated elements but not the exclusion of any other elements.

Figure 2:
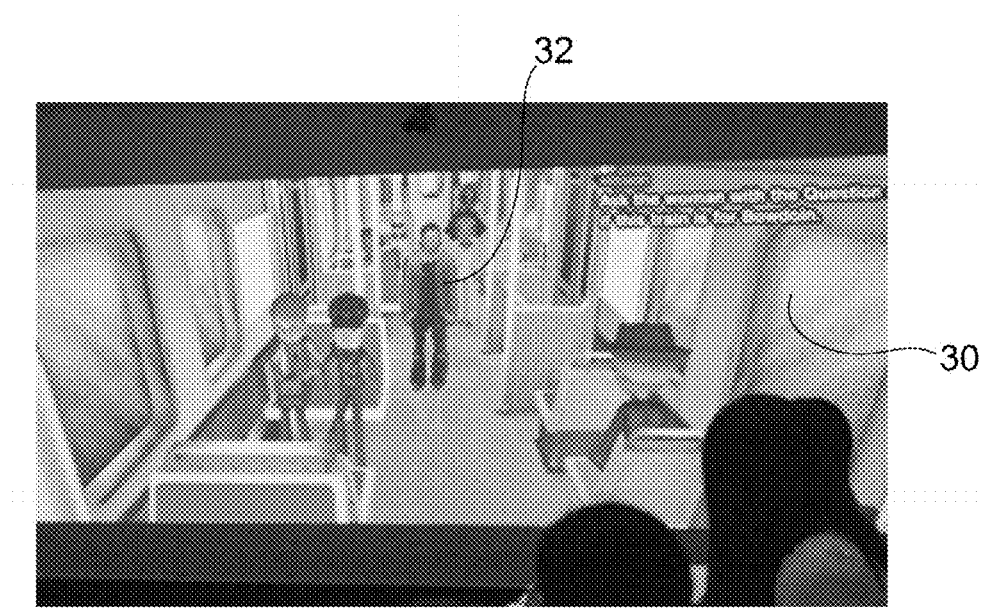
FIG. 2 is an exemplary screen on which contents created by synthesizing a user in real world with a virtual world having a story are displayed.

FIG. 1 is a screen displaying mixed reality contents in which a user is synthesized in a virtual world of a ticket office of a subway station, and FIG. 2 is a screen displaying a mixed reality image by synthesizing the user with the virtual world of the subway so that the user has a feeling as if the user boards a subway.

Therefore, the present disclosure provides an image synthesis technique and an image conversion method by changing a story in addition to configuration of the screen in order to provide virtual experiences having different stories for each virtual space.

A detailed configuration for providing the technique and the method will be described below.

Figure 3:
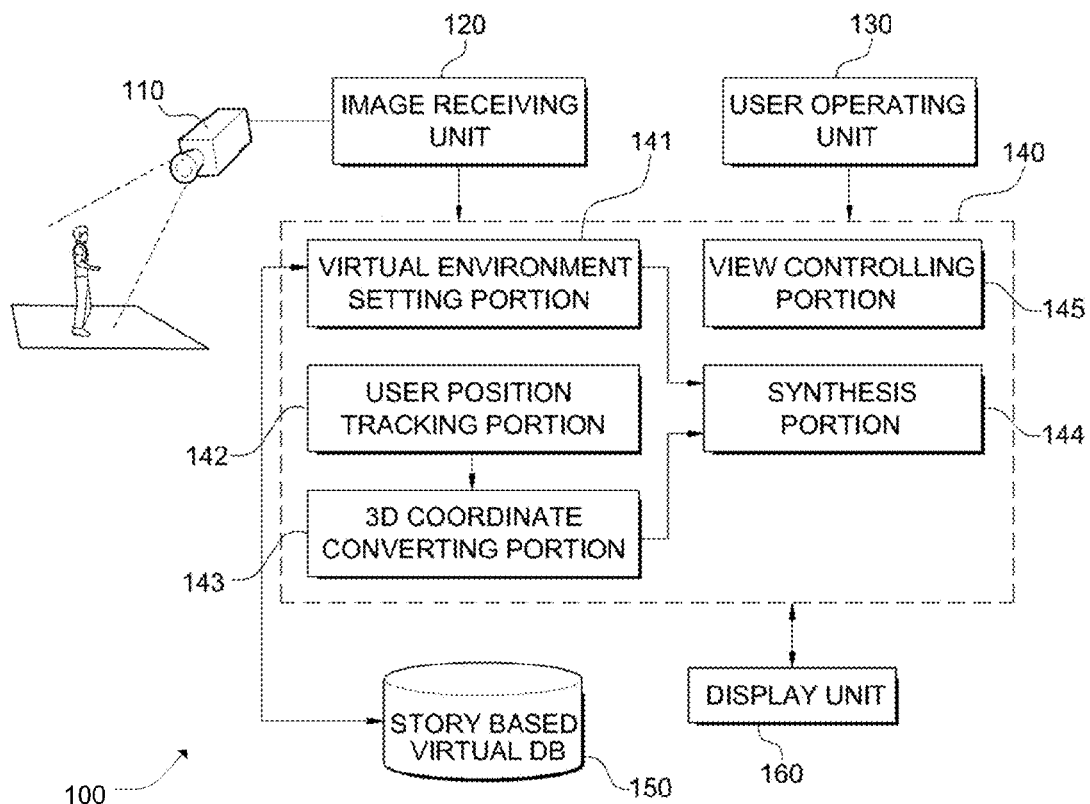
FIG. 3 is a configuration diagram of an apparatus for providing mixed reality contents according to the present disclosure.

Referring to FIG. 3, an apparatus 100 for providing mixed reality contents according to the present disclosure includes an image camera 110, an image receiving unit 120, a user operating unit 130, a mixed reality synthesizing unit 140, a story-based virtual database (DB) 150, and a display unit 160.

The image camera 110 picks up an image of a user who exists in a real environment (a real world). The image camera 110 then transfers the picked-up user image to the image receiving unit 120.

The position, the direction, the resolution and the zoom of the image camera 110 are determined in order to pick up an image of the real environment.

The image receiving unit 120 receives an image of the user ("a user image") from the image camera 110 and transfers the received user image to the mixed reality synthesizing unit 140 in order to synthesize the received user image with a virtual world.

The user operating unit 130 is inputted with operations such as starting, ending, and touching of contents with respect to the mixed reality contents displayed on the display unit 160.

The user operating unit 130 is inputted with an operation for a view point with respect to the mixed reality contents. The view point includes the third person point of view and the first person point of view. In the third person point of view, the user views himself/herself on the screen displaying a mirror image or an image of the camera as it is. In the first person point of view, the user is not shown on the screen, and a screen configuration is changed and displayed depending on the position of the user.

The story based virtual DB 150 stores an image of a 3D virtual world created by virtually modeling the real environment according to the story. The story could be various kinds according to a target experience and may create a variety of virtual spaces by generating various objects with the target experience. For example, a ticket gate, a platform, a ticket office, passersby, an internal structure, and subway vehicles of a Boston subway may be modeled as they are to be implemented in the virtual world.

The display unit 160 displays contents ("mixed reality contents") output from the mixed reality synthesizing unit 140, and provides a realistic feeling as if the user has entered into the virtual world.

The mixed reality synthesizing unit 140 receives an image of the virtual world corresponding to a desired story from the story based virtual DB 150, and synthesizes the user image received through the image receiving unit 120 with the image of the virtual world. The mixed reality contents in which both images are synthesized are output to the display unit 160.

Specifically, the mixed reality synthesizing unit 140 may include a virtual environment setting unit 141, a user position tracking unit 142, a 3D coordinate converting unit 143, a synthesis unit 144, and a view controlling unit 145.

Figure 4:
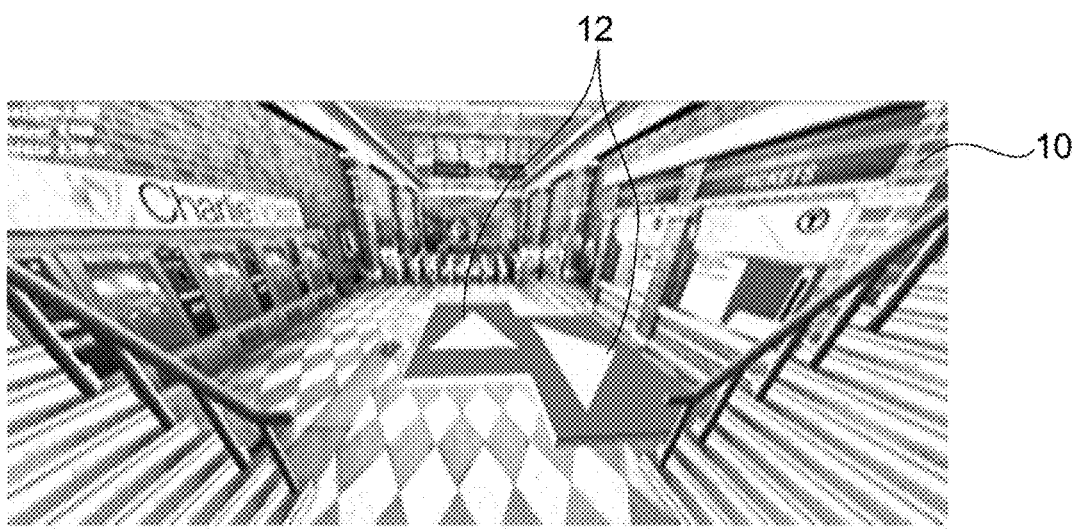
FIG. 4 is a diagram illustrating a screen for setting an action zone in which an image of a user is synthesized with a virtual world in order to implement a mixed reality according to the present disclosure.
Figure 5:
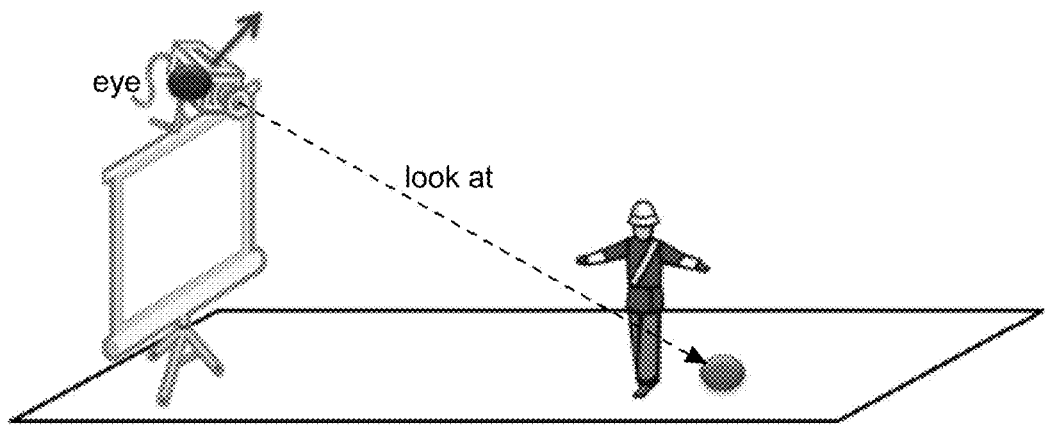
FIG. 5 is a diagram describing a concept for controlling views of the third person point of view and the first person point of view in the present disclosure.

As illustrated in FIG. 4, the virtual environment setting unit 141 sets an action zone 12 to be synthesized with the user image from an image 10 of the virtual world selected through the user operating unit 130 and sets the virtual environment by setting a corner coordinate of the set action zone 12 as a reference point.

The action zone 12 is disposed at a position where the user wants to be synthesized in the virtual space and becomes a zone occupied by the user in a real space. The action zone 12 is set for each virtual space in advance. Therefore, the story based virtual DB 150 of FIG. 3 stores the image of each virtual world created by modeling the real world and information on the action zone 12 set for each image of the virtual worlds.

In this case, the position and the direction of the action zone 12 may be expressed by the position value of a (x, y, z)-axis and the rotation value of a y-axis. When the values are defined as (tx, ty, tz) and ry, the movements in the virtual world for changing the action zone into the reference point may be acquired by using a matrix such as Equation 1 below.

$$M = \begin{bmatrix} \cos(ry) & 0 & \sin(ry) & -tx \\ 0 & 1 & 0 & -ty \\ -\sin(ry) & 0 & \cos(ry) & -tz \\ 0 & 0 & 0 & 1 \end{bmatrix} \quad \text{[Equation 1]}$$

Referring back to FIG. 3, the user position tracking unit 142 of the mixed reality synthesizing unit 140 tracks the position of the user from the user image received from the image receiving unit 120 and calculates the tracked position.

In this case, the size and the position of the user image are set as compared with a screen ratio of the virtual world and may be expressed by a zoom value of the image camera 110 and x and y coordinates of a center position. The three values are defined as zoom, p and q, respectively.

The resolution of the user image received by the image receiving unit 120 is already set and thus may be defined as "cam_width" and "cam_height," as the resolution by the image camera 110.

The user position on the image of the real world is calculated by four corner coordinates, and the coordinates of points positioned at left-top, left-bottom, right-bottom, and right-top are expressed by (u1, v1), (u2, v2), (u3, v3), and (u4, v4) in sequence. The equations for calculating each coordinate is as follows.

$u1 = p - \text{Floor}[(\text{cam}_{width} * \text{zoom})/2]$ $v1 = q - \text{Floor}[(\text{cam}_{width} * \text{zoom})/2]$ $u2 = u1$ $v2 = v1 + \text{Floor}[\text{Cam\_height} * \text{zoom}]$ $u3 = u1 + \text{Floor}[\text{Cam}_{width} * \text{zoom}]$ $v3 = v1 + \text{Floor}[\text{Cam\_height} * \text{zoom}]$ $u4 = u1 + \text{Floor}[\text{Cam}_{width} * \text{zoom}]$ $v4 = v1$ [Equation 2]

In Equation 2 above, floor[x] is a function that outputs a maximum integer which is not larger than x.

The 3D coordinate converting unit 143 converts the user position calculated by four corner coordinates in the user position tracking unit 142 into a 3D coordinate in order to match the calculated user position to the 3D virtual world.

During the conversion, the 3D coordinate converting unit 143 may apply a mathematical algorithm using a camera matrix previously set by calibrating the camera and a distance d between the user and the camera.

The camera matrix is a matrix that converts one point on a world coordinate system into a reference coordinate system of the camera, and may be expressed by the following equation.

$$P = \begin{bmatrix} p11 & p12 & p13 & p14 \\ p21 & p22 & p23 & p24 \\ p31 & p32 & p33 & p34 \end{bmatrix} \quad \text{[Equation 3]}$$

By the above equation, a corner value (u, v) of the user image is converted into a value on a world coordinate (X, Y, Z) as illustrated in the following equation.

$(p31*X+p32*Y+p33*Z+p34)*u=p11*X+p12*Y+p13*Z+p14$ $(p31*X+p32*Y+p33*Z+p34)*v=p21*X+p22*Y+p23*Z+p24$ $X*X+Y*Y+Z*Z=d*d$ [Equation 4]

In Equation 4 above, by acquiring unknown values X, Y and Z, a world coordinate value may be immediately acquired.

Therefore, the synthesis unit 144 matches the action zone with the 3D world coordinate value acquired by the 3D coordinate converting unit 143. The position of the action zone may be designated with reference to a corner coordinate of the action zone set by the virtual environment setting unit 141.

After the matching, the synthesis unit 144 provides the display unit 160 with the mixed reality contents in which the virtual world image and the user image are synthesized.

The synthesis unit 144 changes the position of the action zone per unit time as the position of the user moves, and continuously generates not instantaneous movement images but intermediate images when the position of the user is changed within the virtual world to provide a realistic feeling as if the user is moving in the virtual world.

In this case, the synthesis unit 144 sets a target action zone and a movement time, and utilizes the current positional information regarding the action zone to display a new screen configuration.

For example, it has been assumed that the position of the target action zone is defined as (target_tx, target_ty, and target_tz), a y-axis rotation value is defined as (target_ry), the movement time set by the synthesis unit 144 is defined as dt, a current position is defined as (start_tx, start_ty, start_tz), and the y-axis rotation value is defined as (start_ry). Then the position of the action zone for configuring the screen after t seconds may be calculated as illustrated in Equation 5 below.

$$current_{tx} = start_{tx} + \left(1 - \frac{t}{dt}\right) * (target_{tx} - start_{tx}) \quad \text{[Equation 5]}$$

$$current_{ty} = start_{ty} + \left(1 - \frac{t}{dt}\right) * (target_{ty} - start_{ty})$$

$$current_{tz} = start_{tz} + \left(1 - \frac{t}{dt}\right) * (target_{tz} - start_{tz})$$

$$current_{ry} = start_{ry} + \left(1 - \frac{t}{dt}\right) * (target_{ry} - start_{ry})$$

As illustrated in Equation 5 above, the position of the action zone is a value acquired by moving a change amount between a target point and a current point at the current position per the predetermined unit time.

The view controlling unit 145 changes a viewpoint of the view according to a user's point of view selected by the user operating unit 130 with respect to the mixed reality contents synthesized by the synthesis unit 144.

The user's view point includes the third person point of view or the first person point of view as described above and may be arbitrarily switched according to the user's selection.

The third person point of view is a situation where the user views his/her own image in the screen which is the same as the image viewed through the camera. In contrast, in the first person point of view, the user is not displayed on the screen and the screen configuration is changed depending on the user position.

Figure 6:
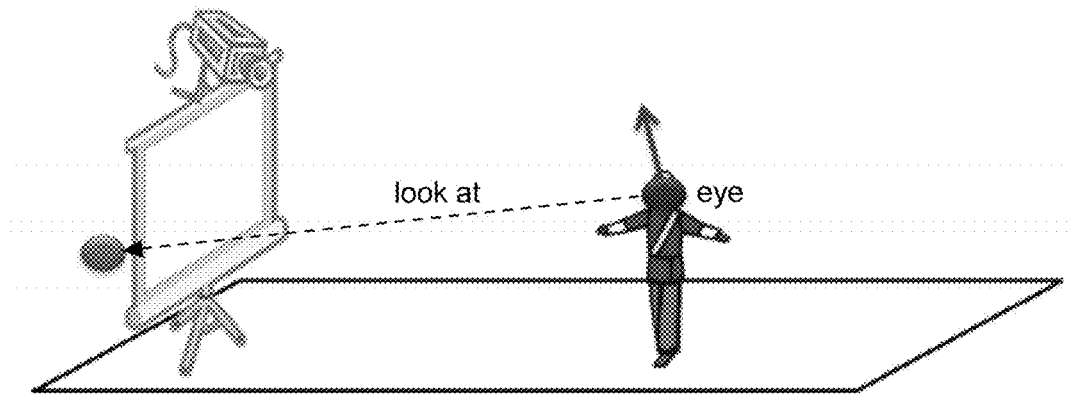
FIG. 6 is a diagram describing a concept for controlling views of the third person point of view and the first person point of view in the present disclosure.
Figure 7:
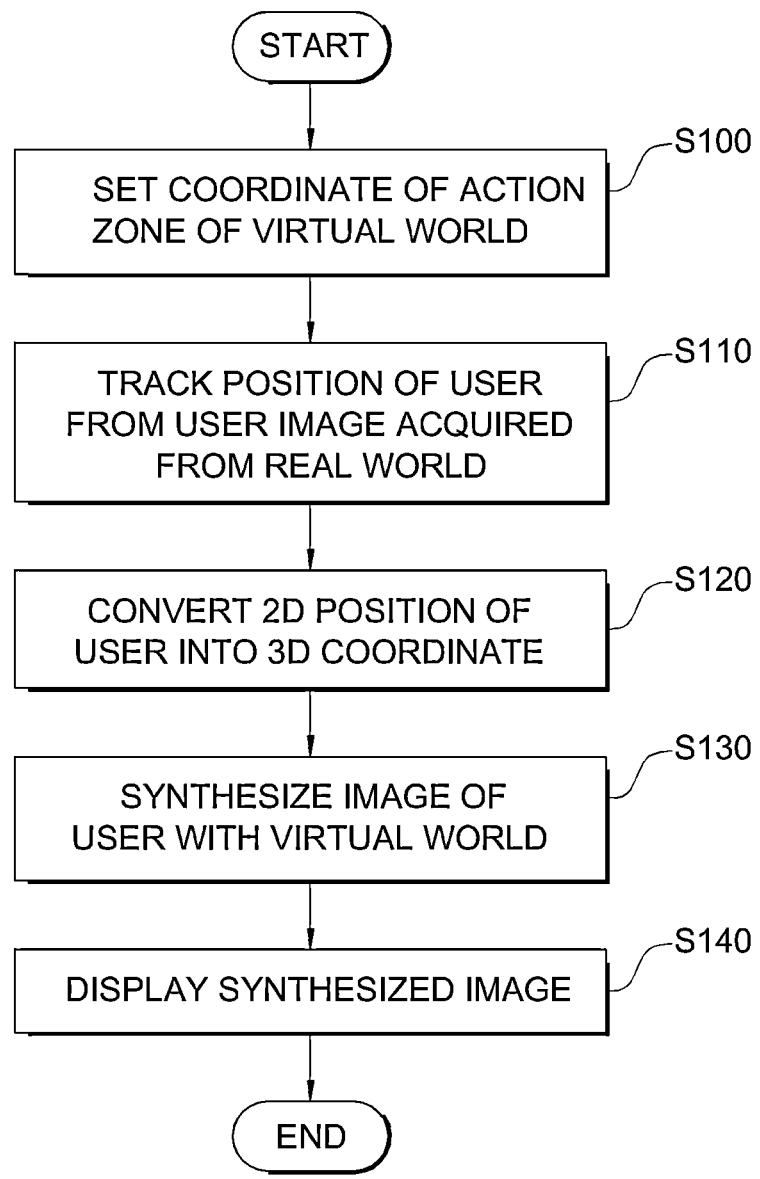
FIG. 7 is a flowchart illustrating an overall flow of a method for providing mixed reality contents according to the present disclosure.

FIGS. 6 and 7 are diagrams describing a principle for controlling the view in the image camera, in the third person point of view and the first person point of view, respectively.

A point marked as "eye" (red point) represents the camera position or the user position, and "look at" (blue point) represents a point to which the camera views, that is, a gaze of the camera or a user's gaze. "Up vector" (red vector) represents a direction vector directed to overhead.

In this case, the "eye" (red point), "look at" (blue point) and "up vector" (red vector) of the third person point of view may become exactly the same value as the position and the gaze of the image camera.

The "eye" (red point), "look at" (blue point) and "up vector" (red vector) of the first person point of view may be a coordinate of a user's face and a point to which the user's gaze is directed.

Therefore, since the image viewed through the camera is displayed as it is in the third person point of view, it is not difficult to implement the third person point of view. However, it is difficult to implement the first person point of view when the user's gaze is not accurately tracked at a long distance in the first person point of view.

Therefore, when the coordinate of the user's face (people_x, people_y, people_z) and the point to which the gaze of the user is directed are given, the offset values (OFFSET_Y, OFFSET_Z) in which a y axis and a z axis are changed may be acquired through the following equation.

Eye=[people_x,people_y,people_z]

Lookat=[people_x,people_y+OFFSET_Y,people_z+ OFFSET_Z]

Up=[0,-eye(z)+lookat(z),-lookat(y)+eye(z)]  [Equation 6]

Herein, the point to which the gaze is directed is set as a constant in order to implement the first person point of view in a state in which the gaze of the user is not accurately tracked at a long distance. Since the screen is always positioned in front of the user in a target system, OFFSET_X may be set to zero (0), and when OFFSET_Y and OFFSET_Z are set as a direction to view slightly downward at a long distance, for example, values of approximately −700 and −4000, respectively, a view screen suitable for the first person point of view may be configured.

Accordingly, according to the configuration of the present disclosure, even though the user is positioned at any point of the world coordinate system in the virtual world created by modeling the real world, the user may be disposed in a desired area by the action zone defined according to the flow of the story. A level at which the image of the user is inclined by the camera and a level at which the bottom of the virtual world is inclined accurately coincide with each other, and as a result, the realistic feeling may be increased.

Since the view screen configuration may be changed to the third person point of view or the first person point of view according to the flow of the story, more varieties of experiences may be provided to the user.

In the present disclosure, when the user moves to a predetermined virtual space, all logical states except for a scene graph are initialized. That is, various parameters constituting the mixed reality contents are reset, and an initialization event occurs in the virtual space, and thus initialization commands of corresponding states, such as placement of the action zone, the size, timer setting, and placement of the user image, which are set for each virtual world, are loaded.

For example, for the case of the mixed reality contents in which the subway can be experienced, when the virtual world is divided according to the story such as "purchasing a ticket", "going down to a platform" and "just after getting on the subway", the same screen and the same experience may always be provided to the user who moves to the corresponding virtual space.

Now, a method for providing the mixed reality contents based on the above configuration, and a specific method for synthesizing images in order to provide the mixed reality contents will be described.

FIG. 7 is a diagram illustrating an overall flow of a method for providing the mixed reality contents according to the present disclosure.

In order to provide the mixed reality contents according to the present disclosure, the virtual world which coincides with the real world is first constructed by virtually modeling the real world with the story.

Thereafter, the apparatus for providing mixed reality contents picks up the user image in the real world by using the image camera and acquires the user image therefrom.

Thereafter, the apparatus for providing the mixed reality contents extracts and selects a virtual world of a user's desired story from a previously stored virtual DB and sets an action zone in which the image of the selected virtual world is synthesized with the image of the user. A corner coordinate of the action zone is set as a reference point (S100).

Thereafter, the user position is tracked from the user image picked up by the apparatus for providing the mixed reality contents to be calculated as four rectangular corner coordinates (S110). A detailed calculation method is performed according to Equation 2 above.

Thereafter, the apparatus for providing the mixed reality contents converts the user position calculated through the previous calculation process (S110) into a 3D coordinate using a camera matrix (S120).

The conversion is a process for converting the corner values of the user image into values (X, Y, Z) on the world coordinate to synthesize the corresponding values (X, Y, Z) with the 3D virtual world.

Thereafter, the apparatus for providing the mixed reality contents matches the user position converted into the 3D coordinate based on the position of the action zone defined in the virtual world to synthesize the image of the virtual world and the user image (S130).

During synthesis, the apparatus for providing the mixed reality contents changes the position of the action zone per unit time as the user position moves and continuously generates not instantaneous movements but intermediate images when the user position is changed within the virtual world to provide a realistic feeling as if the user is moving in the virtual world. The synthesis will be described in detail with reference to FIG. 8.

Thereafter, the apparatus for providing the mixed reality contents outputs the synthesized mixed reality contents to the display unit to display a synthesized image, that is, the mixed reality contents (S140).

Figure 8:
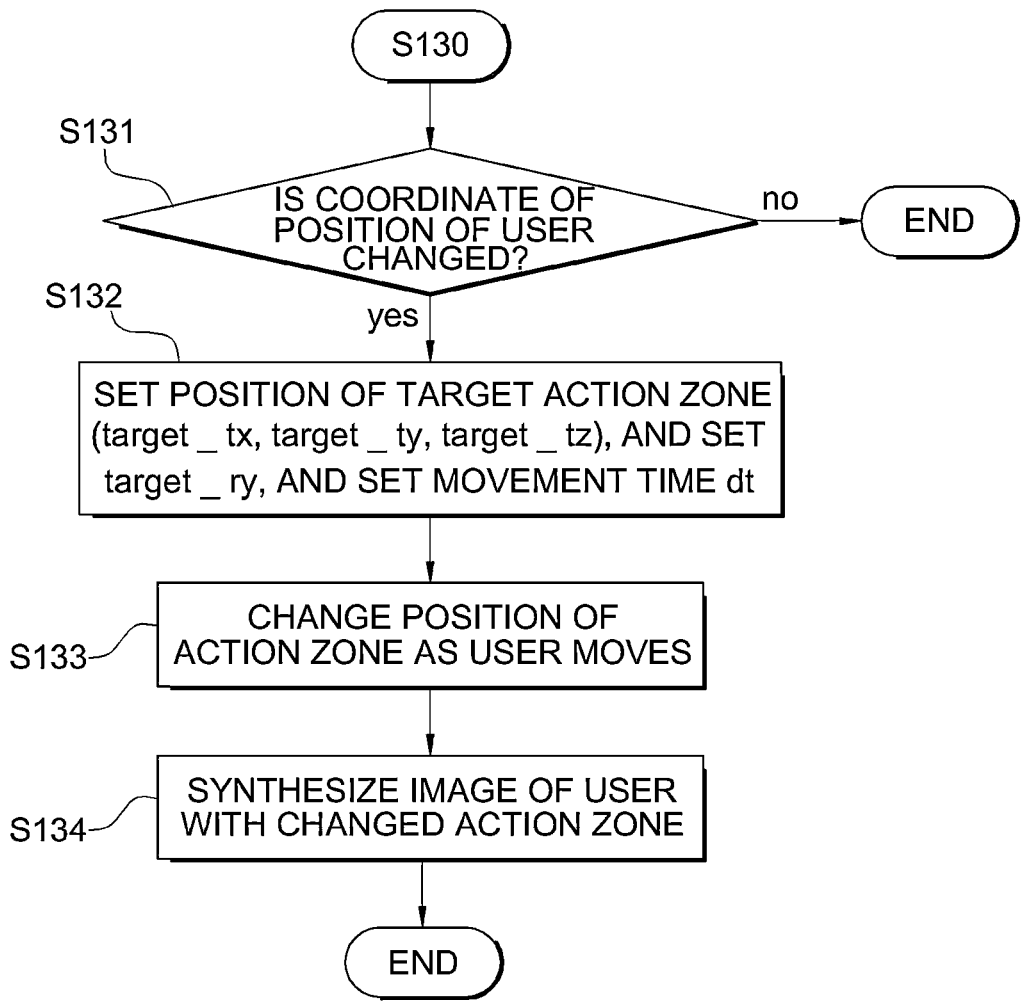
FIG. 8 is a flowchart illustrating a synthesis method depending on movement of a user at the time of providing the mixed reality contents according to the present disclosure.

FIG. 8 is a flowchart illustrating a screen configuring method that allows the user to smoothly moves within the virtual world during the synthesis.

That is, the synthesis unit of the apparatus for providing the mixed reality contents verifies whether the 3D coordinate for the position of the user is changed (S131).

When the 3D coordinate is not changed, the present operation is maintained as it is or the process ends, and when the 3D coordinate is changed, the position of the target action zone and a movement time are set (S132).

The position of the target action zone may be set as a final position to which the user moves, and the movement time may be set as a time when the user moves to the final position. The setting is to make the position of the action zone to the point where the user is positioned per the predetermined unit time while the position of the user moves.

After the setting, the synthesis unit of the apparatus for providing the mixed reality contents moves the position of the action zone per the predetermined unit time based on Equation 5 (S133). Finally, the position of the action zone is moved to the position to which the user moves.

Thereafter, the apparatus for providing the mixed reality contents synthesizes the image of the user to the moved or changed action zone (S134).

Figure 9:
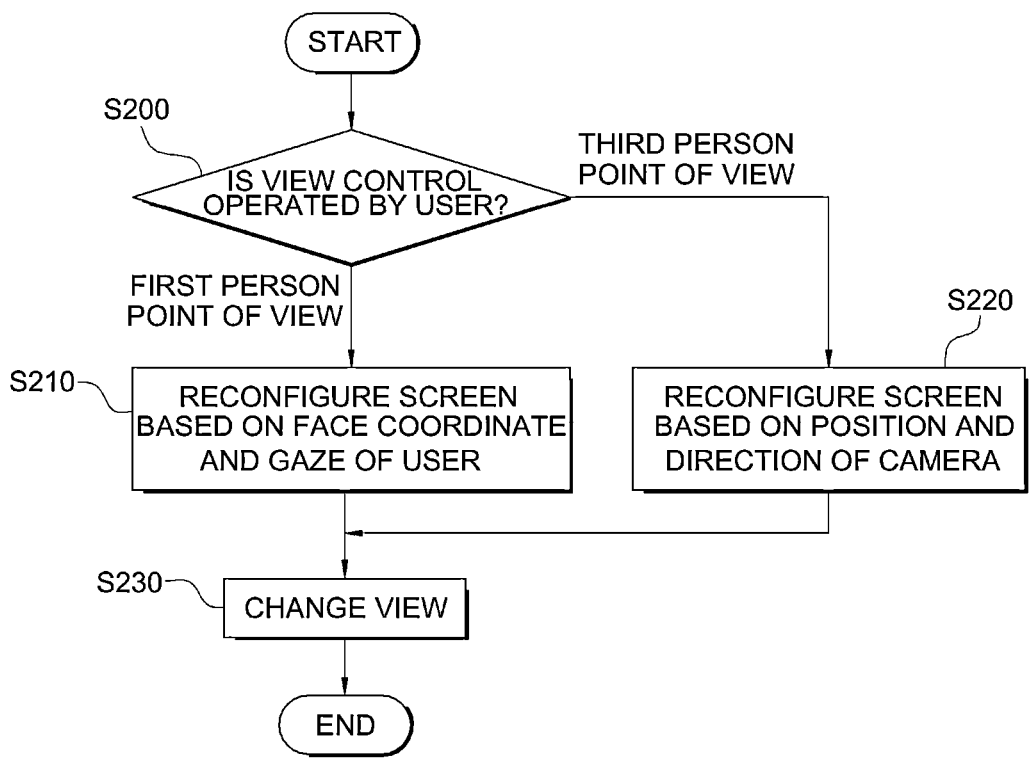
FIG. 9 is a flowchart illustrating a method for controlling a view at the time of providing the mixed reality contents according to the present disclosure.

FIG. 9 is a flowchart illustrating a method for controlling a view at the time of providing the mixed reality contents according to the present disclosure.

It is verified whether the view control is operated through the user operating unit (S200).

As a result of the verification, when the view control is not operated, a current view state is maintained, and when the view control is operated on the third person point of view, the screen is reconfigured based on the position and direction of the camera (S220).

When the view control is operated on the first person point of view, the screen is reconfigured based on the face coordinate and gaze of the user (S210). Herein, the base may be accurate data by measurement and analysis, but when measurement is difficult with respect to the user at a long distance, the base may be data by estimation.

The mixed reality contents may be displayed on the third person point of view or the first person point of view according to the flow of the story by changing the screen to the reconfigured screen to give a realistic feeling and an immersive feeling to the user (S230).

The method according to the exemplary embodiment of the present disclosure is implemented by programs to be stored in computer-readable medium such as, for example, a CD-ROM, a RAM, a ROM, a floppy disk, a hard disk, and an optical magnetic disk. Since the process can be easily performed by those skilled in the art, the process will not be described in detail any more.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A method for providing mixed reality contents for learning through a story-based virtual experience, comprising:

capturing a user image of a user within an actual environment;

setting an action zone within a virtual world in which a 3D image of the virtual world having the story is synthesized with the user image and setting a corner coordinate of the action zone as a reference point for the action zone within the 3D image of the virtual world;

tracking a user position from the user image and calculating the tracked user position as four rectangular corner coordinates;

converting the four rectangular corner coordinates into a 3D coordinate;

matching the 3D coordinate to the corner coordinate of the action zone; and displaying a synthesized image of the user and the virtual world that is based on matching the 3D coordinate to the corner coordinate of the action zone.

2. The method of claim 1, wherein calculating the tracked user position as four rectangular corner coordinates includes using a center coordinate, a resolution, and zoom information of an image camera.

3. The method of claim 1, wherein converting the four rectangular corner coordinates into a 3D coordinate includes using a distance between an image camera and the user and a mathematical algorithm using a camera matrix.

4. The method of claim 1, wherein matching the 3D coordinate to the corner coordinate of the action zone includes changing a position of the action zone over time as the position of the user changes over time.

5. The method of claim 1, further comprising:

verifying whether the user operates a view control with respect to the mixed reality contents;

reconfiguring a screen displaying the synthesized image of the user and the virtual world by calculating a desired direction vector based on a face coordinate and gaze of the user when the view control is operated on a first person point of view; and reconfiguring the screen by calculating a position and direction of an image camera that is capturing the user image of the user when the view control is operated on a third person point of view.

6. The method of claim 1 further comprising:

storing an image of the virtual world created by virtually modeling a real world according to the story; and storing the action zone in the image of the virtual world.

* * * * *